Figure 1:
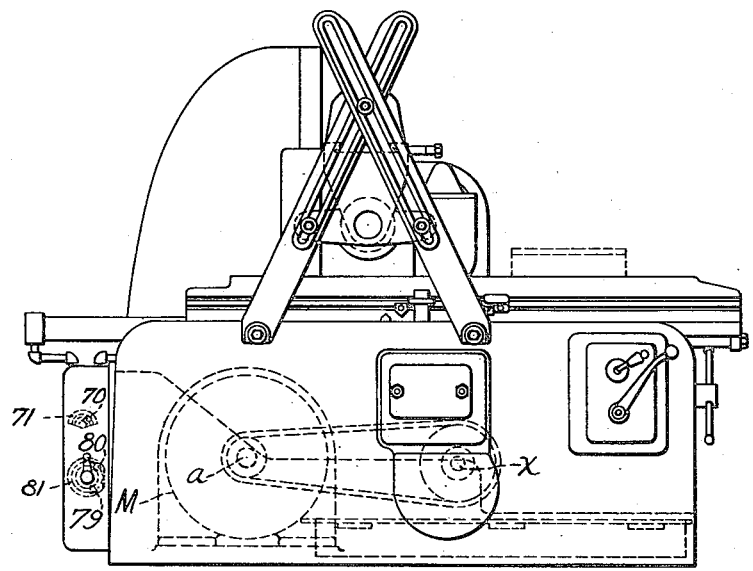

April 2, 1935.   H. ERNST   1,996,465

HYDROELECTRIC VARIABLE FEED CONTROL

Filed July 31, 1930   4 Sheets-Sheet 1

Inventor
Hans Ernst
By Attorneys
Nathan + Bowman

April 2, 1935.   H. ERNST   1,996,465
HYDROELECTRIC VARIABLE FEED CONTROL
Filed July 31, 1930   4 Sheets-Sheet 3
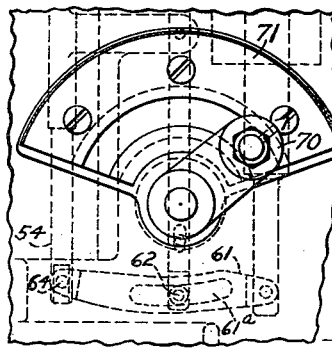
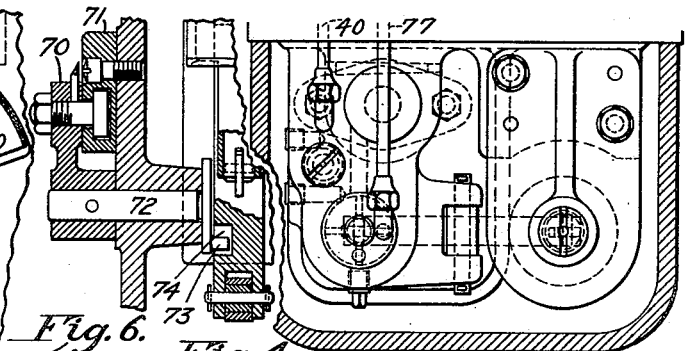
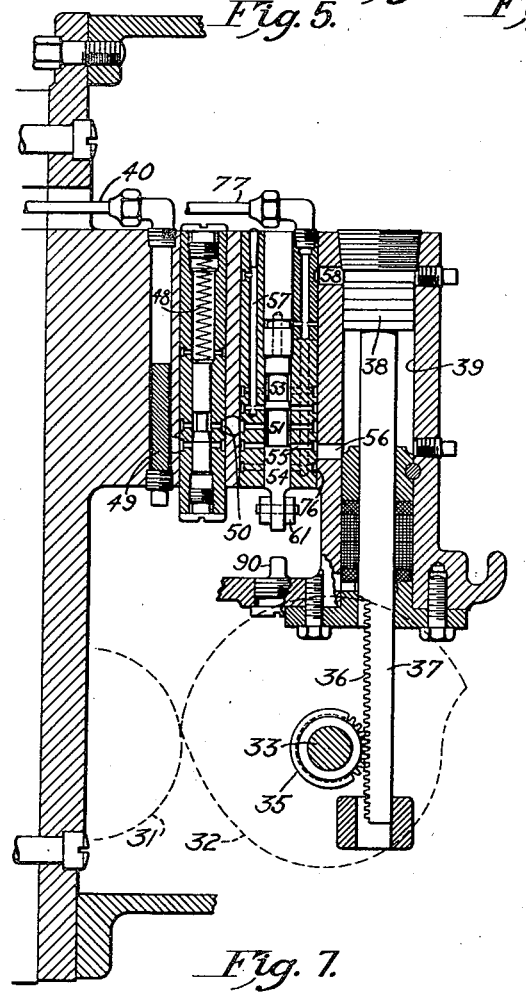
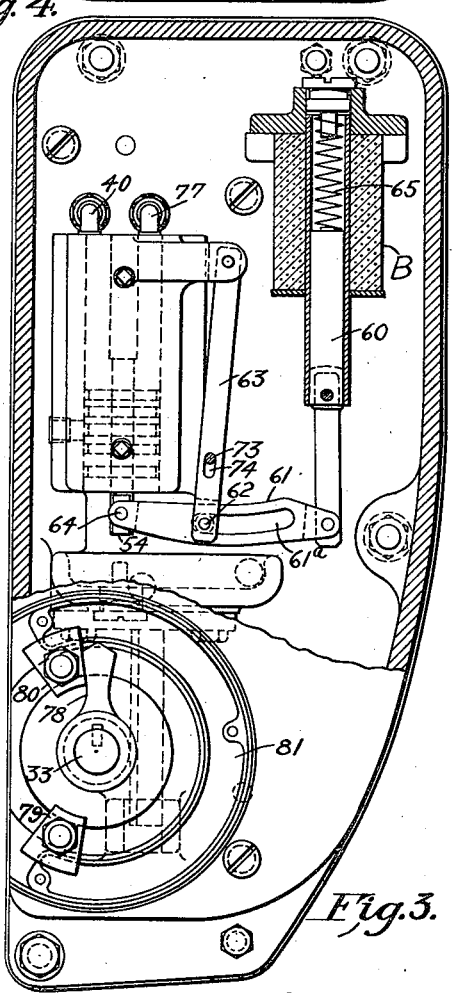
Inventor
Hans Ernst
By Attorneys
Nathan + Bowman April 2, 1935.  H. ERNST  1,996,465
HYDROELECTRIC VARIABLE FEED CONTROL
Filed July 31, 1930  4 Sheets-Sheet 4

Inventor
Hans Ernst
By Attorneys
Nathan & Bowman

Patented Apr. 2, 1935

1,996,465

UNITED STATES PATENT OFFICE 1,996,465

HYDRO-ELECTRIC VARIABLE FEED CONTROL

Hans Ernst, Cincinnati, Ohio, assignor to The Cincinnati Milling Machine Company, Cincinnati, Ohio, a corporation of Ohio Application July 31, 1930, Serial No. 471,961

35 Claims. (Cl. 90—21.5)

This invention concerns rate controlling mechanisms for machine tools and particularly those types of machine tools in which the propelling medium is oil.

It has for its general objects to provide a control device which will automatically adjust the rate of feed in a given machine to its maximum value, during a tooling operation, as determined by the working resistance and without further attention or supervision by the operator.

A further object of this invention is to provide a control device which will continually and automatically regulate the rate controlling mechanism of a machine tool to produce a rate of movement which will be a maximum at all times and under varying values of work resistance, for a given power input.

Still a further object of this invention is to provide a control means which will automatically vary the rate of feed in accordance with the power required to machine a unit area of a work-piece of irregular shape or contour, or a piece of work of heterogeneous formation, some portions of which may be of harder metal than other portions.

This invention also proposes to provide in a machine tool an automatically actuated control mechanism adapted to effect a predetermined rate of feed during idling movements, (when the work resistance is practically zero) and to automatically effect a variation, or variations, in the feed rate when the work resistance reaches some value other than zero, as for example, during a tooling operation.

While this invention is primarily adapted for the feed regulation in hydraulic circuits, its principles and mode of operation may be readily utilized to control the feed rate in mechanically driven tools as will later become apparent.

It has been the practice in the design and construction of machine tools in general, to provide mechanical tripping devices of one form or another to regulate the rate of feed, but, as it is impossible to set the trip dogs or tripping devices so as to increase slightly or decrease slightly the rate of feed in accordance with physical character of the work at hand, the operator has been obliged to set the control devices so as to produce a feed somewhere between the extremes of feed rates which might have been more desirable. This kind of "guess-work" set-ups ofttimes tends toward slow production and machine work varying in degrees of perfection due to incorrect and improper feeds during portions of a tooling operation.

So also has it been impossible heretofore, to so regulate the feed rate that upon encountering "hard spots" in the metal casting or part being machined, no serious injury to the tool or work will occur, and inasmuch as one cannot tell with the eye what portions of a casting are harder than others, an operator has no ready means for enabling him to determine just when to slow down or speed up the feed as the case may be, so as to produce uniformly and accurately machined work. As a consequence, tools and cutters are frequently broken, expensive machinery is unduly strained, and unnecessary delays and attendant expense in placing the machine in working order again are incurred; all of which is primarily due to the fact that the feed rate was either too slow or too fast for the particular character of work at hand.

This invention proposes to overcome the objectionable features in the prior machines by providing a device which automatically re-acts, to variations or fluctuations in the power required to effect a predetermined cut, within the range of the particular machine, upon the rate controlling mechanism to increase or decrease the rate of feed as the occasion requires. This may be accomplished by connecting the armature or core of a solenoid to the control mechanism of the machine tool and connecting the solenoid and electric driving motor in series. Thus, as the resistance to motor movement increases, the current in the electric circuit increases and thereby increasing the magnetomotive force of the solenoid. Conversely, as the work resistance decreases, the current decreases and tends toward de-energizing the solenoid. By connecting the armature to suitably arranged rate control mechanism of the machine tool, the rate of relative movement between the tool and work may be varied directly in accordance with the work resistance.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 9:
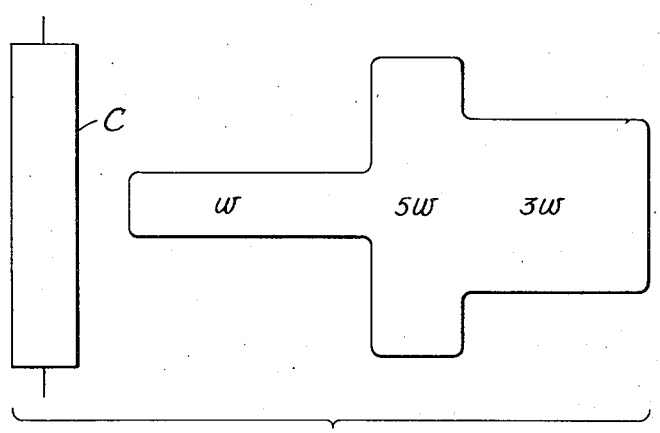
Figure 2:
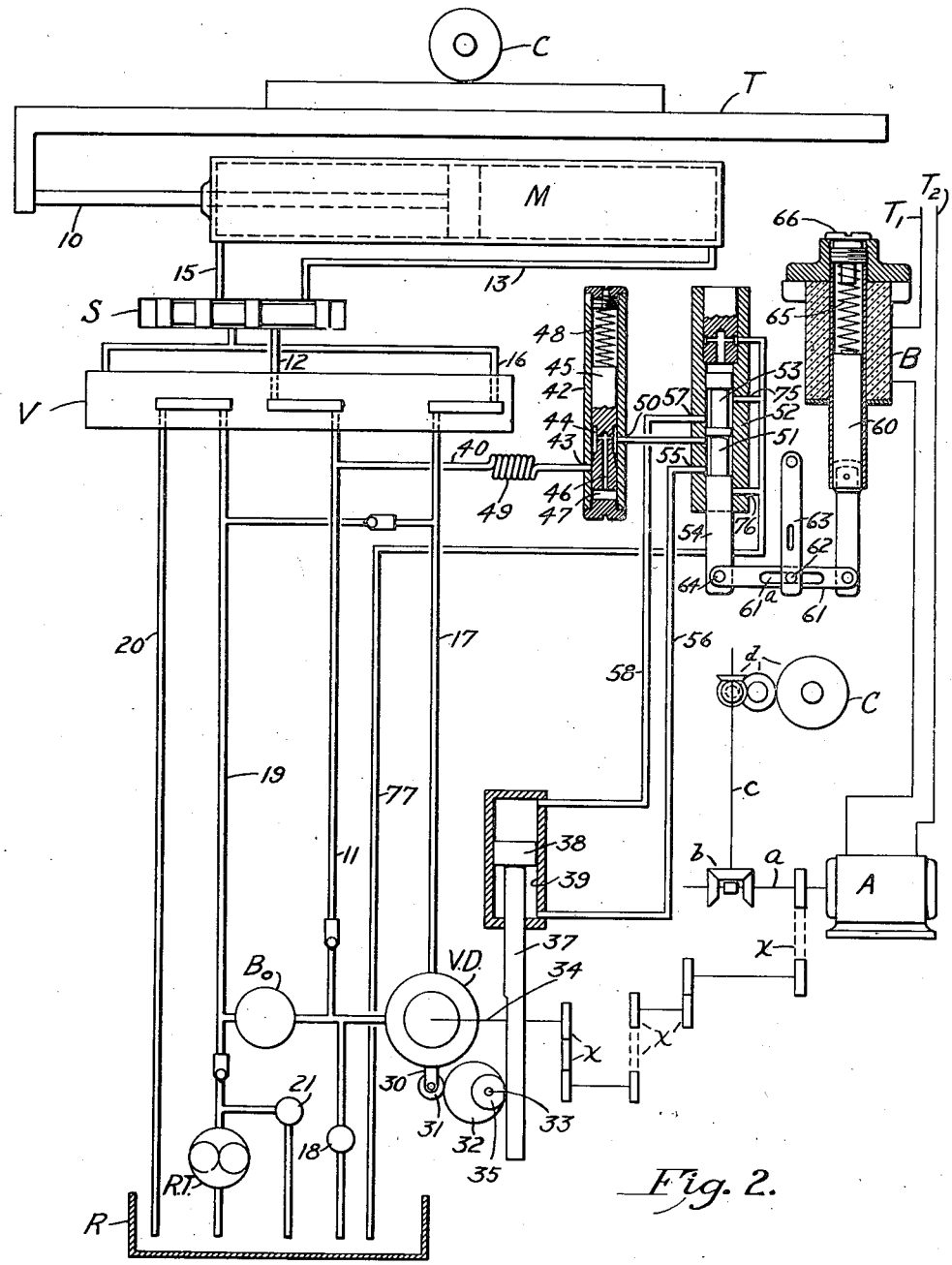
Figure 8:
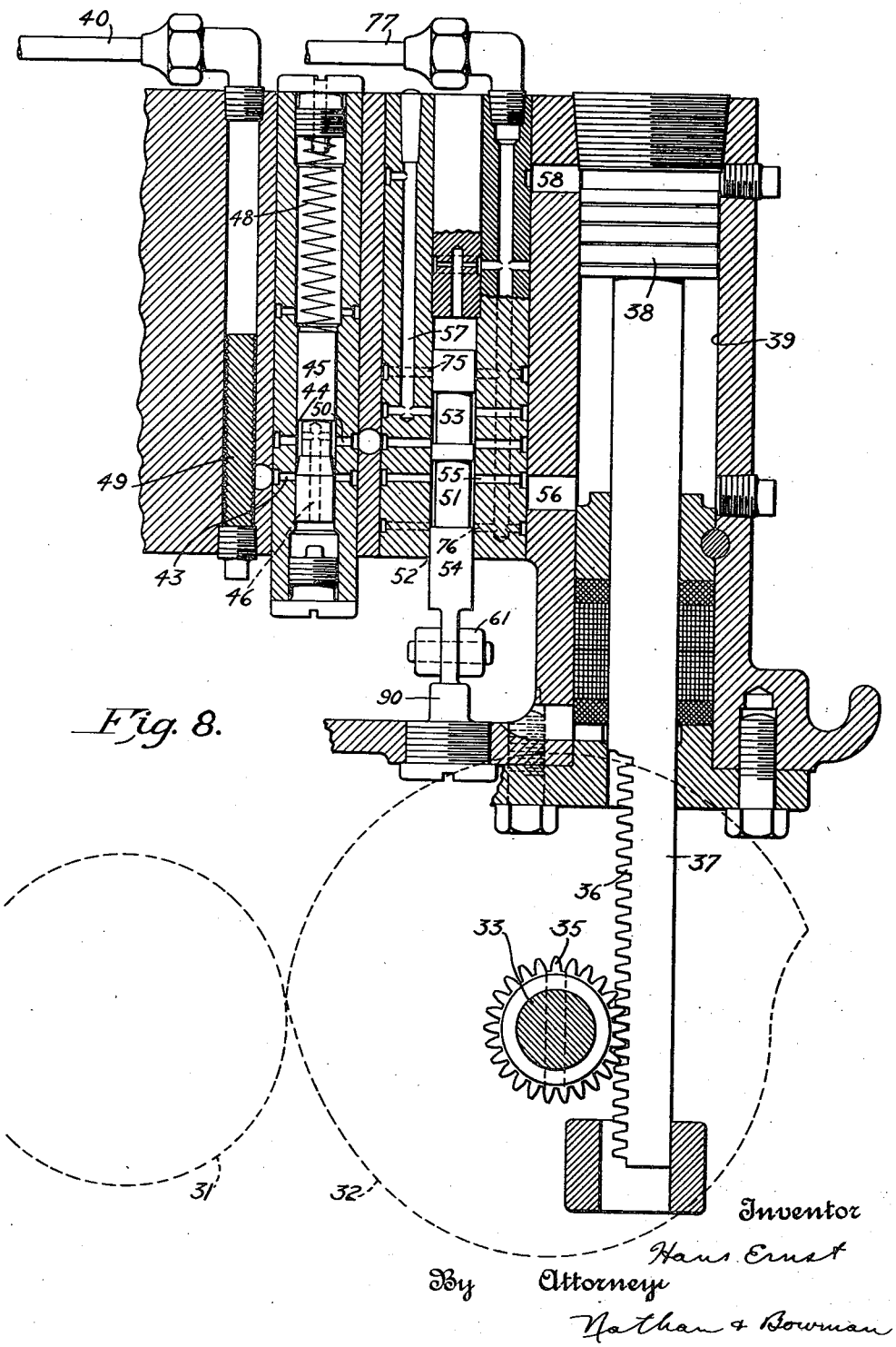

Figure 1 is a side elevation of a representative type of machine tool incorporating this invention. Fig. 2 is a diagrammatic illustration of this invention as applied to one form of variable driving means. Fig. 3 is an elevational view, partly in section, illustrating the solenoid and its connection to portions of the rate control mechanism. Fig. 4 is a plan view thereof. Fig. 5 is a detail view of the constant-power-setting lever and Fig. 6 is a sectional view thereof. Fig. 7 is a sectional development of the parts arranged so as to effect an "approach" feed rate. Fig. 8 is a sectional development illustrating the parts in a position corresponding to a motor load slightly greater than a predetermined maximum and the rate controlling mechanism functioning to decrease such load. Fig. 9 is a diagram of a workpiece to be machined.

Referring now to Figs. 1 and 2, the machine illustrated comprises generally a main frame or base upon which is mounted a work supporting table T fitted for movement either to the left or to the right. Above the table and normally fixed relative thereto, is mounted a tool support provided with a suitable cutting tool C, which may be driven in a manner customarily provided in machines of this character. Fig. 2 illustrates such a drive. Power from the motor A enters the machine through the shaft $a$, through the reversing clutch mechanism $b$ to a vertically arranged shaft $c$ to the gearing $d$ in the spindle head. This being a conventional spindle or cutter drive, further description or illustration thereof is thought unnecessary.

Movement of the table T is effected in this instance by means of an hydraulically propelled motor M, suitably connected to the table T, as by means of the piston rod 10.

With the selector valve V and stop valve S in the positions shown in Fig. 2, fluid under pressure is conveyed through conduits 11, 12, and 13 to the right end of the cylinder and causes the piston and table T connected thereto, to advance toward the left. The rate of advance, however, may be limited by the rate at which the fluid in the discharge side of the cylinder is permitted to escape therefrom or limited by the rate which fluid is supplied to the cylinder. The system represented herein is of the former type and the discharged fluid passes through conduit 15, stop valve S, conduit 16, selector valve V, and conduit 17, to a variable metering unit VD.

The outflow from the VD unit combines with the output of small volume high pressure booster pump $B_0$ which together provides the forward pressure. A high pressure relief valve 18 permits a discharge from the forward pressure line 11 to a reservoir R in the event that the pressure, for any reason, rises above a predetermined maximum. A large volume pump RT, which draws fluid from the reservoir R and furnishes the volume necessary for quick traverse movements of the table also supplies fluid to the booster pump. In the position illustrated in Fig. 2, the larger fraction of the fluid from the RT pump passes through line 19 to the selector valve V which, in this position, short circuits the fluid back to the reservoir through line 20. It will be understood however that the valve V may be positioned so as to effect a rapid traverse forward, feed forward, feed reverse, or rapid traverse reverse, while valve S may be positioned so as to stop and lock the table against further movement. The foregoing briefly describes one form of an hydraulic system to which this invention is applicable and if a more detailed description thereof is desired reference may be had to the British Patent No. 297,104.

The metering pump VD heretofore referred to is of the conventional type variable displacement pump and may have a separate drive, independent of the spindle drive or be driven as shown from the main motor A through the gear train $x$ and shaft 34. The booster pump $B_0$ and the RT pump may also, but not necessarily, be driven from the shaft 34. The volume of flow of fluid through the VD unit is controlled by the position of the shiftable pintle 30 to which is secured a roller 31. A cam or eccentric 32, secured to a shaft 33, serves as a means for shifting and holding the shiftable member of the pump in the desired position.

In addition to the manual means conventionally employed for controlling the flow of the VD pump this invention prescribes an automatically actuated control means which will now be described.

Attached to the eccentric shaft 33 is a pinion 35 which is constantly in mesh with the rack teeth 36 formed on a rod 37. Movement of the rod 37, and thus movement of the eccentric 32 and pump pintle 31, is effected by means of pressure fluid acting upon the sides of the piston 38 within the cylinder 39. Movement of the piston downwardly decreases the flow from the VD pump and decreases the feed rate while movement of the piston upwardly increases the flow and increases the feed rate.

Pressure fluid for actuating the piston 38 may be supplied from any source, preferably of constant pressure, and in the hydraulic system illustrated it is desirable to run a branch line 40 from the high pressure side of the circuit, in this system line 11, to a pressure regulating valve 42.

Fluid entering the valve at 43, passes through a restrictable passage to a reduced portion 44 of the valve piston 45, thence through a central bore 46 to chamber 47 where it re-acts upon the piston 45, in opposition to an adjustable spring 48, to close the opening 43. The purpose of this valve is to supply the control unit with fluid at a constant pressure somewhat lower than the pressure normally maintained in the high pressure line 11. Should the pressure rise in the line 40, the pressure also rises in chamber 47 and tends to shift the piston further to close port 43. So that the reducing valve 42 may receive fluid from the supply line substantially free of pulsations and fluctuations, a choking device 49 is placed in the supply line 40.

Fluid, under a constant pressure, leaves the reducing valve 42 by way of port 50 and enters a control valve 52. From there, depending upon the position of the valve plunger 54, the fluid may pass by way of the reduced portion 51, port 55, conduit 56 to the lower end of the feed regulating cylinder 39, or by way of reduced portion 53, port 57, conduit 58, to the upper end of the feed regulating cylinder.

It has been explained that this invention proposes to regulate the feed in accordance with the work resistance. This may be accomplished by connecting the terminals of a solenoid coil B in series with the motor A and so arranging the parts that movement of the armature or core of the solenoid controls the feed rate changing mechanism.

Referring to the circuit illustrated by Fig. 2, the solenoid B is shown connected in series with the power lines $T_1$ and $T_2$ of the motor A. The armature or core 60 of the coil B, has one end secured to a lever 61 which has an adjustable fulcrum point at 62. The other end of the core 60 slides within the coil B, the inward movement of which is limited by the force exerted by an adjustable spring 65.

Lever 61 has its other end connected at 64 to the shiftable controller element 54. Thus a movement of the solenoid core 60 through the linkage just described, adjusts the position of the control valve, which in turn, regulates the flow of fluid to the feed control cylinder 39.

If the current strength in the winding of the coil B is increased, such as will happen when the opposition to movement of the table T or tool C tends to stall its driving motor, the magnetic field intensity is increased proportionately. By increasing the magnetomotive force of the coil B, the core 60 is moved inwardly against the spring 65, thus shifting the control element to a position such that fluid enters the lower end of the feed cylinder 39 and shifts the parts so as to decrease the flow from the VD pump which decreases the feed rate. As the magnetomotive force decreases (work resistance decreasing), the spring 65 moves the core 60 outwardly which shifts the controller to a position increasing the feed rate.

Since the field intensity of a coil of wire is directly proportional to the current flowing through the winding, it is possible, under given conditions to establish a definite relation between field intensity and electrical current. And by so correlating the winding of the coil (intended current capacity) with the strength of the spring 65 a unit variation in work resistance (or a unit variation in motor load) will produce a unit variation in current passing through the winding of the coil and thus move the core 60 a given distance. This movement, through the mechanism heretofore described, will produce a corresponding change in the feed rate.

However, since machine tools are designed to handle a large variety of work of varying degrees of hardness, shape or quality, it is desirable that the feed rate be proportioned to suit the particular class of work, cutting tools, or finish desired. With this end in view, this invention proposes to provide means for varying the effect of the power required to effect a unit movement of the solenoid core 60 without changing the value of the spring 65.

Figs. 3, 5 and 6 are detail views illustrating one form of such power control. The fulcrum point 62 of lever 61 is designed to be shifted with respect to the ends of the lever by means of a small hand-grasp lever 70. This lever is located on the outside of the machine so as to be within easy reach of the operator, a graduated dial plate 71, informing him of the proper setting. The lever 70 is secured to a short shaft 72 which has, at its inner end, a pin 73 located eccentric thereto. The pin 73 engages a slot 74 formed in the link 63 which carries the fulcrum point 62. Thus, a movement of the power control lever 70 adjusts the position of the link 63 and fulcrum point 62 with respect to slot 61ª formed in the lever 61. As viewed in Fig. 3, movement of the fulcrum point to the right effects a decrease in the power required to effect a movement of the controller element 54 through a unit distance, while movement of the fulcrum toward the left increases the power required to shift the controller a unit distance. In this way there is provided a simple means for varying the power input required to produce a feed rate commensurate with the character of the work.

To put it in another way, this invention proposes a means for so regulating the feed rate that the power consumed remains at a constant value at all times.

Operation

For the purpose of illustration, let it be assumed that it is desired to machine a surface of irregular area, such as illustrated by Fig. 9. The operator mounts the piece on the work table T and starts the machine. The table travels toward the cutter at a rapid traverse rate until suitable trip dogs carried by the table T shifts the selector valve V to effect a slow feed rate shortly before the tool engages the workpiece. As there is no load on the motor at this time, except that of overcoming the friction of the table, the core of the solenoid B is extended and the controller element 54 shifted to its extreme "up" position. With this setting of the control valve, fluid enters through port 50 and passes through ports 55 and 56, conduits 57 and 58, to the lower and upper ends of the speed control cylinder 39. Because of the differential in effective areas of the piston the pressure in the larger end overcomes the pressure in the smaller end and causes the piston 38 to move rapidly downward. This movement, by reason of the rack and pinion connection 35—36 with eccentric 32, reduces the feed rate, in the absence of other forms of low limit control, until a pointer 78 carried by the eccentric shaft 33 contacts with an adjustable stop 79. The abutment is so located as to limit the further reduction in feed rate when the desired low limit or "approach" rate has been reached, and thus the feed is regulated so that the tool engages the work without extreme jarring effects. Usually, the conventional VD unit has at least one volume control which may be set at the desired low limit, and if so, dog 79 may be dispensed with.

The table continues to move at the "approach" rate until the tool contacts with the work-piece at which time the load on the motor increases. The field intensity of the solenoid likewise increases and moves its core inwardly in opposition to the spring 65. Movement of the core 60, shifts the control valve element 54 to a position illustrated by Fig. 2. Fluid then enters the valve through port 50 and passes through port 55, conduit 56 to the lower end of the feed control cylinder and moves piston 38 upwardly increasing the feed rate. Fluid exhausted from the upper end of the cylinder passes back through port conduit 58, port 57, around reduced portion 53, to port 75 and line 77 to the reservoir. The feed rate, and consequently the work resistance increases until the motor load is slightly greater than the predetermined maximum as previously set by the power control. By this time the field resistance in the solenoid B has increased and moved the core further inwardly thereby shifting valve member 54 to a position indicated in Fig. 8. An adjustable abutment 90 controls the outward position of the valve member 50. Fluid from the conduit 50 flows through port 57 and conduit 58 to the upper end of the feed control cylinder, which causes the piston 38 to move downwardly and thus decrease the feed rate. Fluid exhausted from the lower end of the cylinder passes back through conduit 56, port 55, around reduced portion 51, to port 76 and line 77 to the reservoir.

The outflow from the VD unit is varied in this manner until a working neutral is reached at which time the valve element 54 continues to flutter back and forth. The movement of the table continues at this feed rate until the area indicated by $w$ (Fig. 9) is finished and area 5w presents itself under the tool. This larger area produces an increase in the load upon the motor and increases the magnetomotive force of the solenoid and shifts the control valve to decrease the feed rate, as above explained, until a working neutral is again reached. When the tool reaches area 3w, of decreased work resistance, the device automatically adjusts the feed rate control to effect a faster feed.

Similarly is the device automatically responsive to variations in the degree of hardness of the work-piece. If "hard spots" are reached the motor load increases and re-acts to effect a reduction in the rate of feed and conversely, if relatively soft areas are reached, the feed is increased automatically.

To guard against the table movement attaining too high a rate of speed an adjustable dog 80 is positioned on the dial plate 81, (Fig. 3), so as to limit the further movement of the pointer 78, and eccentric 32, carried by the shaft 33, when the desired maximum rate is reached.

As the cutter clears the work-piece the motor load drops, the current flowing through the solenoid winding decreases and the spring 65 moves plunger 60 outwardly. This movement of the plunger 60 shifts the valve element 54 to the position illustrated in Fig. 7, and as hereinbefore explained, fluid under pressure passes to both ends of the cylinder 39. However, due to the differential in piston areas, the fluid pressure in the larger end overcomes the fluid pressure in the smaller end and moves the piston downwardly at a rapid rate and reduces the feed rate to the minimum low limit. By so reducing the feed rate at the completion of a tooling operation on one piece of work, the next piece in line (as in gap milling) is encountered without jar or damage to the work or tool. Similarly when the last piece of work has been machined, the rate of feed is automatically decelerated whereby reversals to table movement may be effected when momentum of the parts is relatively low. It may be noted here that although the movement of the piston 38 from a working neutral position to an idle feed rate position is rapid, the differential action of the fluid pressure has a cushioning effect, which brings about a reduction in feed rate without undue jarring or straining of the parts. However, during a working stroke, fluctuations in work resistance, acting through the mechanism described, produces an immediate and more rapid change in the position of the feed control plunger 38. Thus, for relatively slight variations in feed rates, when variations in the momentum of the parts is not very great, changes in the outflow from the VD pump are effected more rapidly.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A machine tool combining a work support and a tool support; hydraulically actuated means for effecting a relative movement between said supports, said means including an hydraulic motor connected to one of said supports and a variable escapement device adapted to control the rate of movement of said motor; driving means for said escapement device; means including an auxiliary hydraulic motor and control means therefor sensitive to variations from a given torque load on said driving means to vary the action of said escapement device thereby to effect variations in the rate of relative movement between said supports; and means to vary the maximum torque load upon said driving means.

2. A machine tool combining a work-support and a rotatable tool support; hydraulically actuated means for effecting relative rectilinear movement between said supports, said means including an hydraulic motor connected to one of said supports and a variable escapement device adapted to control volumetrically the discharge of fluid from said motor thereby to control its rate of movement; pump means including said escapement device for supplying fluid to said motor; a drive shaft for said fluid supplying means and for rotating said tool support; said escapement device being provided with a shiftable element for varying the rate of flow through the device; and means controlled by variations from a given torque load upon said drive shaft for shifting the position of said shiftable element.

3. In a machine tool combining a multi-speed power transmission adapted to be subjected to varying loads; a power input shaft for driving said multi-speed transmission; hydraulically actuated means for increasing or decreasing the output speed of said transmission; means responsive to variations from a predetermined load upon said drive shaft for rendering said hydraulically actuated means effective to change the output speed of said transmission; and means adjustably controlling the increment of speed change effected by said hydraulically actuated means for a given variation in load on said drive shaft.

4. A milling machine combining a work-table; a tool carrier; a variable speed power transmission for effecting relative movement between said elements, said transmission being provided with a shiftable element for controlling the rate of relative movement between the said elements; driving means comprising an electric motor for said transmission; and means responsive to variations from a predetermined normal value in the resistance to said relative movement for shifting the position of said shiftable element, said means including a reversible hydraulic motor operatively connected with said shiftable element, valve means arranged to direct fluid under pressure selectively to opposite sides of said motor, and an electrically operated relay device responsive to current variations in said drive motor input lines for controlling the position of said valve means.

5. A machine tool combining a work support; a tool spindle; driving means for said spindle; driving means for effecting a continuous and uninterrupted relative movement between said work support and said spindle, one of said driving means being variable; rate control means for said variable driving means; and means responsive to variations in the torque load on said variable driving means for adjusting the said rate control means thereby to effect proportionate variations in the rate of movement of said variable speed driving means; and means adjustably controlling the increment of variation in torque load required to effect a given increment of change in the rate of movement of the variable speed transmission.

6. A machine tool combining a work-carrying member; a tool supporting member; a variable speed driving transmission mechanism for effecting continuous and uninterrupted relative movements between said members at variable rates; control means for said transmission adapted when moved in one direction to increase the rate of movement thereof and when moved in another direction to decrease the rate of movement; means for limiting the movement of said control means to effect a predetermined constant rate of movement of said transmission under idling conditions; and means responsive to variations in load upon said transmission mechanism to effect a variable rate of movement of the said transmission under working conditions.

7. A machine tool combining a work supporting member and a tool supporting member; a variable speed driving transmission arranged to effect a continuous uninterrupted relative movement between said members at a rate commensurate to the resistance encountered; a power input shaft operatively connected with said transmission; a power output shaft between said transmission and one of said supports; means including an electrically operated relay responsive to variations in the torque load on one of said shafts for varying the output speed of said transmission; and means for adjustably controlling the maximum rate of movement between said members for a given power input.

8. In a variable speed power transmission mechanism adapted to move an element continuously and uninterruptedly in opposition to a varying resistance, the combination of a rate governing means for controlling the speed of said element moving transmission; means responsive to an increase in the normal resistance to movement encountered by the said element to control the action of said rate governing means; and manually settable means coacting with said rate governing means for controlling the maximum and minimum rates of movement of the said transmission irrespective of the value of the resistance.

9. A device of the character described combining a variable speed hydraulic motor adapted continuously to move an element in opposition to a normally constant resistance at a normally constant speed; power actuated means operable selectively to increase or decrease the speed movement of said motor to maintain said resistance constant; selective control means for said power means; means automatically responsive to a variation from the normal working resistance encountered by said hydraulic motor to render said power means automatically operative selectively to effect an increase or decrease in the speed of movement of said hydraulic motor, said means operating to effect an increase in the speed of the motor as the resistance decreases, and conversely, under said normal working conditions and to effect a decrease in the speed of movement of said motor when the resistance is substantially zero in value; and means coacting with power actuated means for adjustably controlling the minimum speed of movement of said motor when the resistance encountered thereby reaches said substantially zero value.

10. A machine tool combining a work support; a tool spindle; driving means for said spindle; driving means for continuously effecting a relative movement at a normally constant rate between said work support and said spindle, one of said driving means being variable; an electric motor connectible to drive both of said driving means; means effective to decrease the speed of said variable driving means when the torque load on said electric motor reaches a predetermined maximum limit; means responsive to current variations in the electric motor circuit effective to increase the speed of said variable driving means when the torque load reaches a predetermined minimum limit; and means for adjusting said predetermined maximum and minimum limits.

11. A rate controlling mechanism, combining a variable speed transmission; a driving motor therefor; hydraulically actuated means operable selectively in reverse directions for controlling the output speed of said transmission; a reversing valve for said hydraulic means; an electrically actuated device having an adjustable connection with said valve for shifting the valve thereby to render said hydraulically actuated means effective to vary the output speed of the transmission, said device being responsive to current variations in the power lines to said driving motor; and means for varying the effect of a unit movement of said electrically actuated device upon the action of said control valve.

12. A machine tool combining an element to be moved; a variable speed power transmission including a substantially constant speed electric motor for driving same for imparting a continuous movement to said element at a variable rate; a controller mechanism for varying the output speed of said transmission; electrically actuated means responsive to current variations in the motor circuit incident to variations in the torque load on the said motor for actuating said controller mechanism, said means normally operating to effect a predetermined change in output speed of the transmission for a unit change in current value; and adjustable connections between said last mentioned means and said controller mechanism for varying the increment of change in output speed effected by said controller mechanism for said unit change current value.

13. A feed controlling device for a machine tool combining, a variable speed transmission; a tool support and a work support, one of said supports being adapted to be actuated by said transmission; a power control device for regulating the capacity power output of said transmission; and means responsive to variations in work resistance for alternatively increasing the rate of movement of said shiftable support when the value of the work resistance encountered thereby is below the preselected power capacity of said transmission and for decreasing the rate of movement of the said movable support when the resistance encountered thereby tends to exceed the preselected power capacity of said transmission.

14. A milling machine combining, a tool carrier; a reciprocable work support; hydraulic means including a motor and a variable escapement device connected therewith for effecting movement of said reciprocable support, said escapement device including a shiftable element adapted in its various positions to vary the rate of flow thereby to vary the rate of movement of said work support; means normally tending to move said shiftable element to a position effecting an approach feed rate; adjustable means for varying the approach feed rate; and means rendered effective during a tooling operation to increase or decrease the rate of movement of the work support in proportion to changes in work resistance.

15. A machine tool combining a tool support and a work support; a variable speed transmission for effecting relative movement between said supports; hydraulically actuated means for varying the rate of action of said transmission thereby to vary the rate of said relative movement; control means for said hydraulically actuated means comprising a control valve and an actuator therefor, said actuator being arranged automatically to respond to unit variations in resistance to support movement under normal conditions of operation and adapted to effect operation of said valve to positions effecting proportionate changes in the rate of action of said transmission; a motion transmitting instrumentality between said actuator and said valve; and means for varying the ratio of valve movement to actuator movement thereby to vary the magnitude of rate change with respect to any given change resistance.

16. A control device for a variable speed power transmission combining hydraulically actuated means for varying the rate of action of the said transmission comprising control means for the hydraulically actuated rate varying means including a control valve and an actuator therefor, said actuator being arranged to respond to variations in load upon the transmission and to actuate said valve accordingly thereby to effect changes in the rate of action of the transmission; and means for varying the ratio between valve movement and actuator movement thereby to vary the increment of rate change with respect to any given change in load value upon the transmission.

17. A power transmission combining an hydraulic motor; a variable flow pump unit connected therewith and provided with a shiftable element adapted in its various positions to regulate the displacement capacity of the said pump thereby to regulate the rate of movement of the motor; a rate controlling mechanism for adjusting the position of said shiftable element; and electromagnetic means, actuated in accordance with changes in working resistance encountered by said motor, for controlling the positioning of said rate controlling mechanism.

18. A plurality of relatively movable supports; a variable speed transmission for effecting relative reciprocatory movement between supports; electrically controlled hydraulically actuated means responsive to load variations on the transmission for automatically varying the action of said transmission thereby to vary the rate of relative movement between said supports; and means for adjustably controlling the action of said last mentioned means for limiting the power available in effecting relative movement between said supports to a predetermined value.

19. A device of the character described combining an hydraulic motor; a variable flow pump unit connected with said motor, including a volume control element adapted in its various positions to regulate the flow through said pump and thereby regulate the rate of movement of said motor; an auxiliary motor for adjusting the position of said volume control element; a controller for said auxiliary motor; and electromagnetic means controlled by variations in load on said first mentioned motor for actuating said controller.

20. A machine tool comprising a work carrier and a tool carrier; hydraulically actuated means for effecting relative movement between said carriers, said means including an hydraulic motor and a variable delivery pump unit provided with an adjustable volume control element; a prime mover connected to drive said pump unit; an auxiliary hydraulic motor for adjusting the position of said volume control element; a controller for said auxiliary motor; and electrically controlled means operatively associated with and responsive to variations in said prime mover for actuating said controller.

21. A machine tool combining a work support and a tool support; a variable speed transmission for effecting relative reciprocatory movement between said supports; electrically controlled hydraulically actuated means for automatically varying the rate of action of said transmission, in accordance with variations in work resistance, thereby to vary the rate of relative movement between said supports; and means for adjustably controlling the value of the said variations in work resistance required to render said electrically controlled hydraulically actuated means effective to change the rate of action of said transmission.

22. A machine tool combining a reciprocable work carrier; a tool carrier; a common driving means and connections therefrom to said carriers, the drive connection to one of said carriers being variable; a rate controlling mechanism for said variable drive connection; and electromagnetic means automatically actuated by variations in one of said drive connections for varying the action of said variable drive connection; and means for adjustably controlling the value of the variation required to render said last mentioned means effective to vary the action of the variable drive connection.

23. A machine tool combining a reciprocable work carrier; a tool carrier, a common driving means for said carriers, the drive means for one of said carriers, being capable of variation in rate of movement between predetermined limits whereby the associated carrier may be propelled at various rates of movement, a rate controlling mechanism associated with said variable drive means, means automatically actuated in accordance with variations in one of said drive means for operating the said rate controlling mechanism to vary the speed of movement of said variable drive means and its associated carrier; and means for varying the effect of said variations upon the action of said automatic means.

24. A variable speed transmission for effecting relative movement between supports; hydraulically actuated rate varying means for the transmission operative to effect changes in the rate of movement of said transmission, a normally-constant speed prime mover arranged to drive the said transmission; and electrically actuated means, responsive to variations in working loads on said prime mover, for rendering said rate varying means effective to increase or decrease the transmission speed in accordance with said variations in load.

25. A plurality of driving transmissions adapted to transmit power in opposition to each other, one of said transmissions being variable; a prime mover common to both of said transmissions; rate varying means for the variable speed transmission including an hydraulic motor and control means therefor adapted when shifted to one position to effect movement of said motor to increase the rate of movement of the variable speed transmission, and when shifted to another position to effect movement of said motor to decrease the speed of said variable speed transmission; and means, responsive to variation in load upon said prime mover, to adjust the positioning of said control means.

26. A variable speed driving transmission combining, a prime mover; rate varying means for the transmission including an hydraulic motor; means responsive to power variations in said transmission for controlling the action of said hydraulic motor thereby to vary the rate of operation of the transmission in accordance with the load thereon; means for varying the effect of a predetermined power variation upon the action of said responsive means; and means for adjustably controlling the limits of speed of the transmission.

27. A variable speed driving transmission combining, a motor; an hydraulic motor for varying the rate of movement of said first motor; valve means for said hydraulic motor; electrically actuated means responsive to load variations on said first motor for actuating said valve means to render said hydraulic motor operative to vary the rate of movement of the said transmission; and adjustable means for controlling the degree of load variation required to render said rate varying actuating means effective.

28. A machine tool combining a reciprocable work-carrier; a tool carrier, driving means including a prime mover and connections therefrom to both of said carriers, the connection to one of the carriers being capable of variations in rate of speed; rate controlling mechanism for said variable drive connection, and means automatically actuated by variations in said driving means for actuating said rate controlling means to a position effecting a change in the action of said variable drive connection; and manually settable means for varying the effect of unit variations in the driving means upon the actuation of the said rate controlling means.

29. A rate control mechanism for a milling machine having a tool support and a translatable work support combining a variable speed power transmission for imparting a translatory movement to one of said supports at a feed rate selectively in opposite directions; means for controlling the rate of speed of said transmission; means responsive to variations in load on the said transmission in moving said movable support against a resistance for controlling the operation of said rate controlling means; and means controlling the maximum power available to effect a continuous and uninterrupted translation of said translatable support in either direction.

30. A feed control device for a milling machine having a work support and a tool support combining a variable speed power transmission for imparting feed movements to one of said supports; means for controlling the rate of speed of said transmission and thereby the rate of feed; means responsive to variations in power required to move said movable support against a resistance for rendering said rate controlling means effective selectively to increase and decrease said speed rate in proportion to the said variation in power; and means rendering said rate varying means ineffective to effect further changes in rate of movement when the rate of support movement reaches a predetermined value irrespective of the value of the resisting force encountered by said support.

31. A feed controlling device for a machine tool having a prime mover; a variable speed feed transmission driven by the said prime mover; a rate controlling mechanism for said transmission including means for varying the rate of feed and power operated means for actuating same; means responsive to unit variations in load upon said prime mover for rendering said power operated means effective to actuate said rate varying means to a position effecting a predetermined change in the said rate of feed; and means for varying the increment of feed change effected for any unit change in load variation.

32. A control for the transmission of a machine tool having a work support and a tool support; combining a variable speed driving mechanism for effecting relative feeding movement between said supports at variable rates; a prime mover adapted to drive the said transmission; electrically actuated means responsive to unit variations in load upon said prime mover for proportionately varying the rate of action of said speed mechanism and thereby the rate of said relative feed movement; and means for varying the increment of speed change for any predetermined variation in motor load.

33. A rate control for a machine tool having a work support and a tool support; a multi-speed transmission adapted to impart relative feeding movement between said supports at variable rates combining power operated rate varying means for effecting variations in the rate of speed of said transmission to thereby vary the rate of relative feeding movement between said supports; means responsive to resistance to movement encountered by one of said supports for rendering said power operated rate varying means selectively operative to increase and decrease the said rate of feed as the resistance to movement respectively decreases and increases; and means rendering said rate varying means ineffective to effect further changes in rate of speed when the rate of relative movement between said supports reaches a pre-selected value.

34. A device of the character described for controlling the rate of movement between a work support and a tool support of a machine tool combining means for effecting relative movement between said supports at varying rates, said means including an hydraulic motor operatively connected with said supports, a variable flow hydraulic unit connected with said motor and provided with a volume control element adapted in its various positions to regulate the flow of fluid therethrough and thereby control the rate of movement of said hydraulic motor; a prime mover connected with a source of power for actuating said variable flow unit; and electrically actuated means, including a reversible motor connected to move said element in reverse directions, responsive to variations in load on said prime mover for altering the position of said volume control element in accordance with said variations thereby to correlate rate of feed with load value on the prime mover; and means effective to render the action of said reversible motor ineffective when the rate of relative movement between said supports reaches a predetermined speed irrespective of load value on the prime mover.

35. A device of the character described for controlling the feed movement between a work support and a tool support of a machine tool combining a multi-speed transmission for imparting a feed movement to one of said supports at a given rate; electrically actuated means responsive to unit variations in load on the transmission for effecting a change in the said rate of feed in accordance with said variations; means rendering said feed rate varying means inoperative to effect further changes in feed rate when the rate of feed reaches a predetermined value; and means for varying the degree of feed rate change for any given variation in load.

HANS ERNST.